(12) United States Patent
Hinds

(10) Patent No.: US 8,578,688 B2
(45) Date of Patent: Nov. 12, 2013

(54) BASECUTTER FOR A HARVESTER

(75) Inventor: Michael L. Hinds, Thibodaux, LA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/071,837

(22) Filed: Mar. 25, 2011

(65) Prior Publication Data

US 2012/0240544 A1    Sep. 27, 2012

(51) Int. Cl.
*A01D 45/02* (2006.01)

(52) U.S. Cl.
USPC .......................................................... 56/102

(58) Field of Classification Search
USPC ......... 56/102, 53, 56, 63, 500, 503, 157, 255, 56/256, 289, 295, 121.4, 121.41, 13.6, 56/DIG. 20, 6, 121.43, 320.1, 320.2
See application file for complete search history.

(56) References Cited

U.S. PATENT DOCUMENTS

| | | | | |
|---|---|---|---|---|
| 1,729,280 A * | 9/1929 | Tiedemann | | 56/102 |
| 1,779,020 A * | 10/1930 | Swint | | 56/503 |
| 2,532,174 A * | 11/1950 | Lieberman | | 56/255 |
| 2,588,764 A * | 3/1952 | Richmond | | 56/327.1 |
| 3,507,102 A * | 4/1970 | Best et al. | | 56/12.3 |
| 3,555,798 A * | 1/1971 | Eder | | 56/295 |
| 3,604,189 A * | 9/1971 | Harer et al. | | 56/295 |
| 3,654,751 A * | 4/1972 | Meharry | | 56/56 |
| 3,673,779 A * | 7/1972 | Scarnato et al. | | 56/503 |
| 3,772,864 A * | 11/1973 | Rodrigue | | 56/63 |
| 4,157,004 A * | 6/1979 | van der Lely | | 56/13.6 |
| 4,292,790 A * | 10/1981 | Mathews | | 56/13.6 |
| 4,487,003 A * | 12/1984 | Mathews et al. | | 56/13.6 |
| 4,502,267 A * | 3/1985 | Klinner | | 56/13.6 |
| 4,512,141 A * | 4/1985 | Mathews et al. | | 56/13.6 |
| 5,546,737 A * | 8/1996 | Moosbrucker | | 56/94 |
| 5,605,032 A * | 2/1997 | Gantzer | | 56/6 |
| 5,651,243 A * | 7/1997 | Arnold et al. | | 56/94 |
| 5,901,538 A * | 5/1999 | Vohl | | 56/15.2 |
| 6,318,055 B1 * | 11/2001 | Bird | | 56/6 |

* cited by examiner

*Primary Examiner* — Thomas B Will
*Assistant Examiner* — Mai Nguyen
(74) *Attorney, Agent, or Firm* — Quarles & Brady LLP

(57) ABSTRACT

A harvester for harvesting stalks of stalk-like plants. The harvester includes a chassis, at least one ground contacting propulsion device connected to the chassis, and a basecutter assembly. The basecutter assembly is coupled to the chassis. The basecutter assembly includes a plurality of cutting knives and a pair of counter rotating plates. The pair of counter rotating plates include a first plate and a second plate, each of which have at least one of the plurality of cutting knives attached thereto. The first plate rotates about a first axis. The first plate has at least one portion thereof that extends in a radial direction such that the portion would interfere with the knife of the second plate except that the first plate is offset in a direction parallel to said first axis relative to said knife of said second plate.

12 Claims, 3 Drawing Sheets

BASECUTTER FOR A HARVESTER

FIELD OF THE INVENTION

The present invention relates to agricultural harvesters, and, more particularly, to harvesters for the harvesting of stalk-like crops.

BACKGROUND OF THE INVENTION

Two known types of stalk-like crops in the North American market are sugarcane and sorghum. Other stalk-like or cane-like crops have been receiving, increasing attention in bioenergy circles, such as miscanthus, energy cane, and giant reed. During the harvesting of sugarcane, it is known to top the sugarcane plant by cutting off the top portion of the plant using a separate cutter head and allowing the top of the plant to simply fall to the ground.

Sorghum is a major cereal grain that is one of the oldest known crops and is used as a staple food in many parts of Africa and Asia. Sorghum is a major feed grain crop in the US, Mexico, Argentina, Australia, and South Africa. It is believed that sorghum was introduced into the United States in the 1700's and some believe that Benjamin Franklin introduced the first grain sorghum crop. The seed of grain sorghum is the smallest of the major spring-planted field crops, such as corn and soybeans.

Both sugarcane and sorghum are members of the grass family. Sugarcane is native to warm, temperate to tropical regions, the cane having stout, jointed, fibrous stalks that are rich in sugar and measure six to nineteen feet tall. Sugarcane is able to convert up to two percent of the incident solar energy into biomass. Once sugarcane is planted, a stand can be harvested several times. After each harvest, the cane sends up new stalks called rattons. Each successive harvest produces a decreasing yield, eventually leading to a replanting operation.

The harvesting of sugarcane includes the cutting of the cane at the base of the stalk, stripping of the leaves, chopping the cane into consistent lengths, and depositing the cane into a transporting device. The harvester typically blows the leaves and such back onto the ground.

Sugarcane harvesting machines utilize a basecutter device that is attached to the frame of the machine. Prior art basecutters do not provide a positive kicking action to the stalk after it is initially cut. The stalk may be cut multiple times before the forward motion of the harvesting machine forces the stalk onto the top surface of the cutting disk and it is routed for further processing. The multiple cuts on the stalk result in the loss of crop material that is left in the field and it also causes splitting damage to the harvested stalk as it is being hit multiple times by the cutting blades. Additionally, prior art designs have a rather large opening between the basecutter plates into which the cut stalks often fall and are split longitudinally, leaving part of the stalk in the field and a much damaged portion sent into the harvesting machine.

What is needed is a basecutter that kicks the cut end of the stalk onto the top of the plate after it has been cut the initial time and to reduce the gap between the plates so as to limit damage to the cut stalks.

SUMMARY

The invention in one form is directed to a harvester for harvesting stalks of stalk-like plants. The harvester includes a chassis, at least one ground contacting propulsion device connected to the chassis, and a basecutter assembly. The basecutter assembly is coupled to the chassis. The basecutter assembly includes a plurality of cutting knives and a pair of counter rotating plates. The pair of counter rotating plates include a first plate and a second plate, each of which have at least one of the plurality of cutting knives attached thereto. The first plate rotates about a first axis. The first plate has at least one portion thereof that extends in a radial direction such that the portion would interfere with the knife of the second plate except that the first plate is offset in a direction parallel to said first axis relative to said knife of said second plate.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention and such exemplifications are not to be construed as limiting the scope of the invention in any manner.

DETAILED DESCRIPTION

Figure 1:
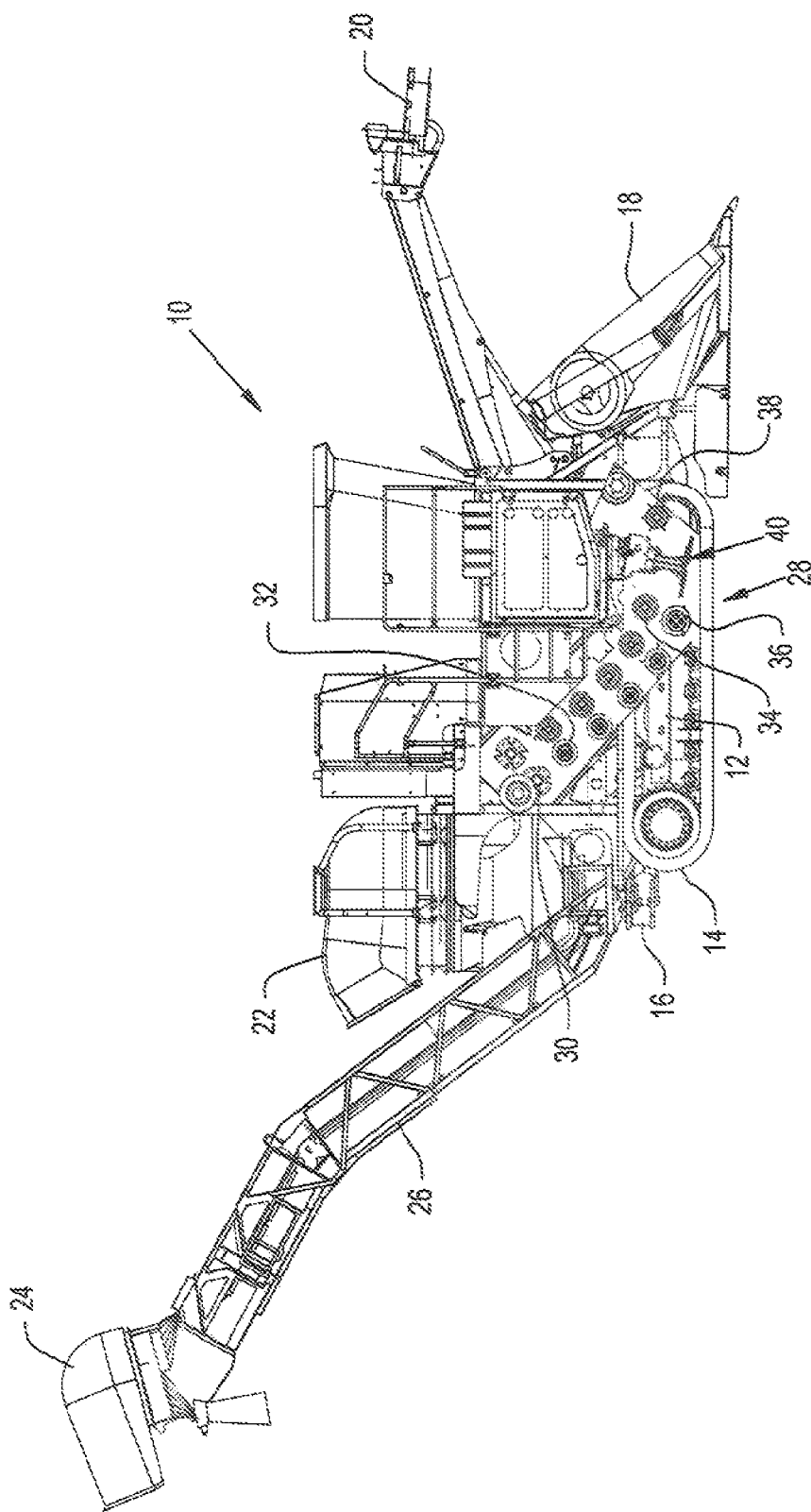
FIG. 1 is a side view of an embodiment of an agricultural harvester of the present invention, including a basecutter assembly of the present invention.

Referring now to the drawings, and more particularly to FIG. 1, there is shown an embodiment of an agricultural work machine in the form of a harvester 10 for the harvesting of stalk-like crops. Harvester 10 includes an undercarriage 12 having a ground contacting propulsion system 14 attached thereto. A frame 16 is connected to undercarriage 12, which may be integral therewith and may be permanently attached thereto or may be moveable relative thereto. Harvester 10 additionally includes crop dividers 18, a topper 20, a primary extractor 22, a secondary extractor 24, an elevator 26, and a stalk processing section 28. Topper 20 cuts off the upper portion of the crop, either allowing it to fall on the ground or moving it to another portion of the machine for further processing. Primary extractor 22 blows the lighter weight leafy material from harvester 10. Secondary extractor 24 provides another flow of air to remove lighter weight material from the processed crop stalks. Elevator 26 moves chopped pieces of stalk from the main portion of harvester 10, rearward and toward a stalk holding device, such as a wagon (not shown).

Stalk processing section 28 includes chopper knives 30, feed rollers 32 an upper feed roller 34, a butt lift roller 36, a knockdown roller 38, and a basecutter assembly 40. As cane moves into harvester 10, knockdown roller 38 functions to knockdown a portion of the cane before it meets basecutter assembly 40. After the cane is cut, then butt lift roller 36 lifts up the butt end of the cane so that it can be engaged with, the upper feed roller 34 and subsequent feed rollers 32. As the cane is moved further into stalk processing section 28, it encounters chopper knives 30 that chop the stalk into substantially uniform lengths and passes the material toward primary extractor 22 as it proceeds to leave harvester 10 for being deposited into the wagon (not shown).

Basecutter assembly 40 includes a first cutter 42 and a second cutter 44, each having' respectively rotating blades 46 and 48. Rotating blades 46 and 48 counter-rotate relative to each other on respective first axis 50 and second axis 52.

Figure 2:
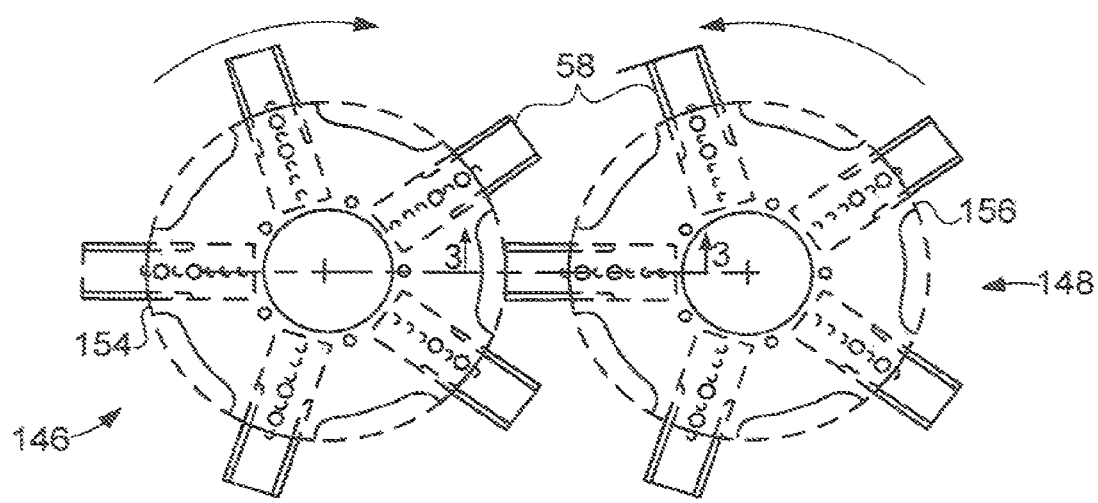
FIG. 2 is a top view of a prior art set of basecutter blades.
Figure 3:
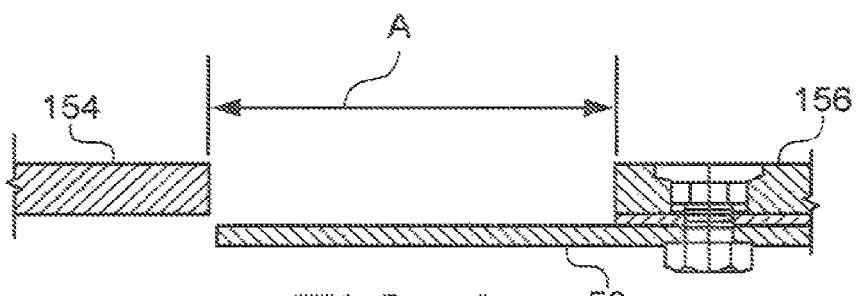
FIG. 3 is a sectional side view taken along 3-3 of the basecutter blades of FIG. 2.

Now, additionally referring to FIGS. 2 and 3, there is illustrated prior art rotating blades 146 and 148 having knives 58 that extend from plates 154 and 156. Knives 58 extend from plates 154 and 156 and, for clearance purposes, scallops are included in plates 154 and 156 with knives 58 extending to the circular perimeter noted as dashed lines. As can be seen in FIG. 3, the extension of plate 154 leaves an open space having a distance A plus the space of the scallop from plate 156 to plate 154. Distance A is from the effective outer perimeter of plate 154 to the effective outer perimeter of plate 156, which also substantially corresponds to an exposed. length of knife 58.

Figure 4:
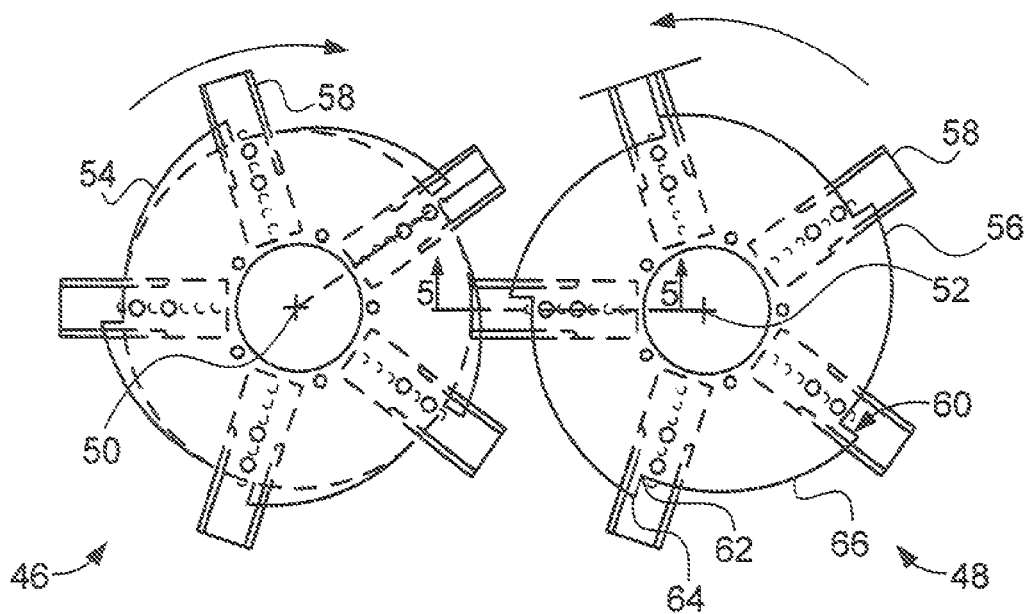
FIG. 4 is a top view of an embodiment of the basecutter counter rotating blades of the present invention.
Figure 5:
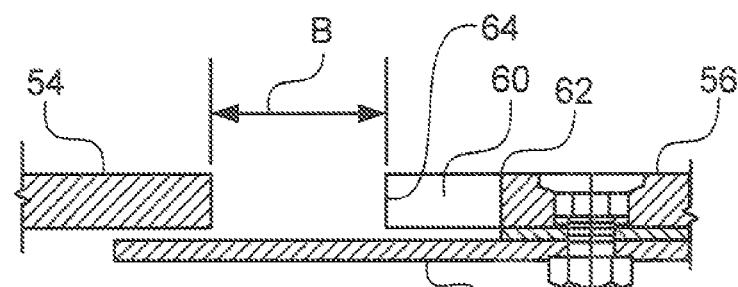
FIG. 5 is a cross sectional side view taken along 5-5 of the basecutter blades of FIG. 4.

Now, additionally referring to FIGS. 4 and 5, the embodiment of the present invention is shown in contrast to the above discussed prior art. Here, rotating blades 46 and 48 rotate about axes 50 and 52, and include first plate 54, second plate 56, and knives 58. Knife 58 extends such that it is beneath a portion of the other plate as it rotates proximate thereto. This causes an effective overlap, as illustrated in FIG. 5, where the effective distance between plate 54 and plate 56 is distance B. As can be seen in comparison to the prior art, distance B is substantially smaller than distance A.

Each plate 54 and 56 has faces 60 that result from the configuration of plates 54 and 56. Faces 60 extend radially respectively prom axes 50 and 52 being parallel thereto. Each face 60 includes a base 62 and a peak 64. Base 62 is closest to the respective axes 50 and 52, while peak 64 is the farthest that plates 54 and 56 extend respectively from axes 50 and 52. There is a smooth transition 66 that extends from base 62 of a face 60 to the peak 64 of an adjacent face 60. Smooth transition 66 may be in the form of a curve 66.

As illustrated, there is a face 60 associated with each knife 58 and each face 60 may be positioned in a direction parallel to the respective axes 50 and 52 above knives 58. Although faces 60 are illustrated as being associated with each knife 58, other configurations are also contemplated where faces 60 may be offset therefrom and be positioned elsewhere around plates 54 and 56. Additionally, although there is illustrated a one-to-one correspondence between faces 60 and blades 58, additional or fewer faces are also contemplated. Still further, it is also contemplated that faces 60 may have a different shape and orientation than that which is illustrated.

Plates 54 and 56 counter rotate and are mirror images of each other so that, as a stalk of cane-type plant enters into basecutter assembly 40, knives 58 encounter the stalk, cut it, and faces 60 encounter a side of the stalk and push it up and preclude it from falling into the gap between knives and/or plates 54 and 56. This advantageously provides for more efficient cutting in that the stalks are only cut once before being deposited on the top surface of cutter plate 54 or 56. This results in less field loss and damage to the harvested stalks, using less energy in the process.

As plates 54 and 56 counter-rotate, the positioning of knives 58 are such that they are interleaved in a nonconflicting manner such that knives 58 of plate 54 do not interfere with knives 58 of plate 56. Additionally, faces 60 are oriented such that they also are interleaved so that, as a face 60 passes by the other plate, it is substantially located equidistance from the faces most adjacent on the other plate. This interleaving also contributes to reducing the amount of free space for the stalks to fall back towards the ground once the stalks are cut by knives 58.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A harvester for harvesting stalks of stalk-like plants, said harvester comprising: a chassis; at least one ground contacting propulsion device connected to said chassis; and a basecutter assembly coupled to said chassis, said basecutter assembly including: a plurality of cutting knives; and a pair of counter rotating plates including a first plate and a second plate each of which have at least one of said plurality of cutting knives attached thereto, said first plate rotating about a first axis, said first plate having at least one portion that extends in a radial direction such that said portion would interfere with said knife of said second plate except that said first plate is offset in a direction parallel to said first axis;

wherein said first plate has at least one face associated with said at least one portion, said face being substantially oriented parallel to said first axis as it extends radially from said first axis;

wherein said at least one portion is a plurality of portions and said at least one face of said first plate is a plurality of faces each portion having a face, said first plate having a predetermined number of said plurality of cutting knives connected thereto, said plurality of faces corresponding to said predetermined number;

wherein each of said faces have a base and a peak, said base being the closest portion of said face to said axis, said peak being the farthest portion of said face from said axis; and wherein said plurality of faces include a first face and a second face, said base of said first face extending to said peak of said second face in a smooth transition of said first plate.

2. The harvester of claim 1, wherein said first plate and said second plate are substantially mirror images of each other.

3. The harvester of claim 1, wherein each of said faces is located above a corresponding one of said plurality of knives in said direction.

4. The harvester of claim 1, wherein said smooth transition is a curve.

5. The harvester of claim 1, wherein said second plate has a plurality of faces, each of said plurality of faces of said second plate being substantially oriented parallel to a second axis as each face extends radially from said second axis.

6. The harvester of claim 5, wherein as said first plate and said second plate respectively rotate about said first axis and said second axis in counter rotating directions said faces of said first plate and said faces of said second plate are positioned to interleave between each other as they become proximate to each other.

7. A basecutter for a harvester used for the harvesting of stalks of stalk-like plants, said basecutter comprising:
a plurality of cutting knives; and
a pair of counter rotating plates including a first plate and a second plate each of which have at least one of said plurality of cutting knives attached thereto, said first plate rotating about a first axis, said first plate having at least one portion that extends in a radial direction such that said portion would interfere with said knife of said second plate except that said first plate is offset in a direction parallel to said first axis;

wherein said first plate has at least one face associated with said at least one portion, said face being substantially oriented parallel to said first axis as it extends radially from said first axis;

wherein said at least one portion is a plurality of portions and said at least one face of said first plate is a plurality of faces each portion having a face, said first plate having a predetermined number of said plurality of cutting knives connected thereto, said plurality of faces corresponding to said predetermined number;

wherein each of said faces have a base and a peak, said base being the closest portion of said face to said axis, said peak being the farthest portion of said face from said axis; and wherein said plurality of faces include a first face and a second face, said base of said first face extending to said peak of said second face in a smooth transition of said first plate.

8. The basecutter of claim 7, wherein said first plate and said second plate are substantially mirror images of each other.

9. The basecutter of claim 7, wherein each of said faces is located above a corresponding one of said plurality of knives in said direction.

10. The basecutter of claim 7, wherein said smooth transition is a curve.

11. The basecutter of claim 7, wherein said second plate has a plurality of faces, each of said plurality of faces of said second plate being substantially oriented parallel to a second axis as each face extends radially from said second axis.

12. The basecutter of claim 11, wherein as said first plate and said second plate respectively rotate about said first axis and said second axis in counter rotating directions said faces of said first plate and said faces of said second plate are positioned to interleave between each other as they become proximate to each other.

* * * * *

UNITED STATES PATENT AND TRADEMARK OFFICE
CERTIFICATE OF CORRECTION

| | | |
|---|---|---|
| PATENT NO. | : 8,578,688 B2 | |
| APPLICATION NO. | : 13/071837 | |
| DATED | : November 12, 2013 | |
| INVENTOR(S) | : Michael L. Hinds | |

It is certified that error appears in the above-identified patent and that said Letters Patent is hereby corrected as shown below:

In the Specification

Col. 3, line 32, "respectively prom" should read --respectively from--

Signed and Sealed this
Eighteenth Day of February, 2014

Michelle K. Lee
*Deputy Director of the United States Patent and Trademark Office*